Patented Feb. 24, 1931

1,794,119

UNITED STATES PATENT OFFICE

CHARLES S. PALMER, OF EVANSTON, ILLINOIS, ASSIGNOR, BY MESNE ASSIGNMENTS, TO PARKE, DAVIS & COMPANY, OF DETROIT, MICHIGAN, A CORPORATION OF MICHIGAN

ALIPHATIC ARSENO COMPOUND

No Drawing. Application filed December 12, 1925. Serial No. 75,115.

The new compounds to which this invention relates may be broadly defined as arseno-compounds comprising at least one substituted aliphatic group or radical. It is to be understood that by the term "substituted" group or radical is meant such a group or radical containing an amino-, hydroxyl-, carboxyl-group, or other salt forming groups or salt forming derivatives thereof.

The nature of the new compounds and the manner in which they may be prepared can be best conveyed to those skilled in the art by the following recital of a number of examples. It must be understood that these examples are illustrative only and that the invention is not limited thereto, since the compounds produced therein are merely representative of a large class of compounds, which are intended to be protected within the scope of the appended claims.

In general the new compounds can be produced by condensing appropriate arsonic acids by reduction. In some cases the desired compounds may be obtained by interaction of appropriate arseno-compounds as will more clearly appear in Examples VII and VIII below.

The new compounds are in general yellow solids, from which derivatives such as salts, esters, amides and substituted amides of the carboxyl-group and numerous others can readily be produced by standard chemical methods. The various compounds which contain salt-forming groups are readily soluble in dilute aqueous alkalies and in pyridine. Many of the compounds are remarkable for their therapeutic action, especially on spirochaetes and trypanosomes.

*Example I.*—26.5 grams of sodium arsono-propionate and 60 grams of sodium hypophosphite are dissolved in 300 cc. of 15% sulphuric acid and the mixture is allowed to stand in the cold. A yellow compound precipitates slowly and is filtered out at intervals of two or three days until the reduction is complete. The precipitate is dried in vacuum over sulphuric acid. The compound contains 50.5% of arsenic. The reaction and the constitution of the product are believed to be expressed by the following equation:

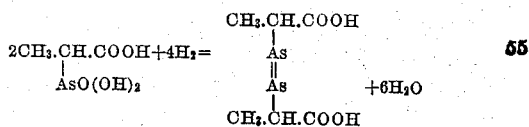

*Example II.*—25.5 grams of alpha-arsono-N-caproic acid are stirred up with 125 grams of 50% hypophosphorous acid and enough water to effect complete solution. The mixture is allowed to stand at room temperature and the yellow product which slowly separates is filtered out at intervals of several days and dried in vacuum over sulphuric acid. About 11 grams of product is obtained which contains 39% of arsenic. The reaction and the constitution of the product are believed to be expressed by the following equation:

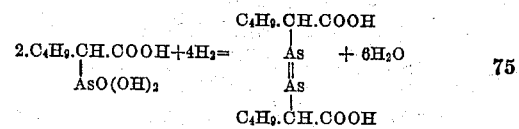

*Example III.*—26.5 grams of sodium arsono-propionate, 18.2 grams of arsenic trichloride and 120 grams of sodium hypophosphite are dissolved in 600 cc. of 15% sulphuric acid. On standing a red precipitate forms gradually and is filtered out at intervals of three days or a week, washed and dried in a vacuum. The product contains 67% of arsenic. It is thought that the arsenic trichloride is hydrolyzed to arsenic trioxide and that one molecule of the oxide is condensed by reduction with two molecules of the arsono-propionic acid in accordance with the following equation:

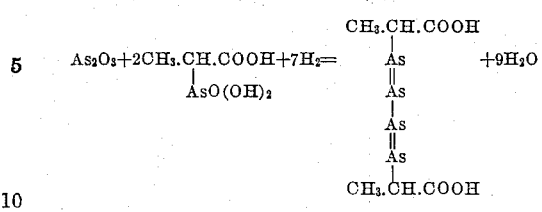

*Example IV.*—80 grams of sodium hydroxide and 50 grams of arsenic trioxide are dissolved in 150 cc. of water. 38 grams of alpha-bromo-propionic acid are added, the mixture diluted to 1.5 liters and acidified with hydrochloric acid and filtered. 250 cc. of hypophosphorous acid are added and the mixture is allowed to stand. The product which precipitates is the same as obtained in Example III.

*Example V.*—17 grams of crude beta-hydroxyethylarsonic acid together with some arsenious acid, 100 cc. of water and 120 grams of 50% hypophosphorous acid are mixed. A yellow precipitate begins to form almost immediately and it is filtered out at intervals of several days until the reaction is completed. The various fractions vary from yellow to orange in color. The product contains about 70–72% of arsenic, corresponding approximately to three atoms of arsenic in the molecule.

*Example VI.*—10.8 grams of arsanilic acid, 50 cc. of a molar solution of sodium arsono acetate, 61 grams of sodium hypophosphite and 80 cc. of 37% hydrochloric acid are dissolved in 250 cc. of water. Five fractions of the product were obtained on standing in the cold, of which the middle fraction was nearly pure hydrochloride of p-aminophenylarseno-acetic acid. The reaction is thought to be expressed by the following equation:

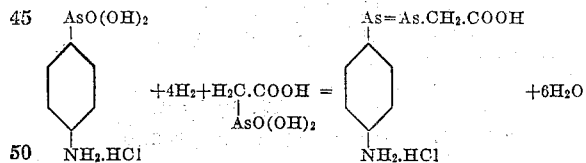

*Example VII.*—13.5 grams of arseno-acetic acid and 22 grams of 3,3′-diamino-4,4′-dihydroxyarsenobenzene dihydrochloride are dissolved in 80 cc. of 10% sodium hydroxide. The mixture is warmed on a steam bath in a current of nitrogen for an hour, cooled and made neutral with hydrochloric acid. The precipitated product is filtered out of contact with air and dried in an atmosphere of carbon dioxide. The new compound is a yellow powder, readily soluble in sodium hydroxide or hydrochloric acid, and is believed to be 3-amino-4-hydroxyphenyl-arsenoacetic acid and the reaction and constitution of the product (base) are thought to be expressed by the following equation:

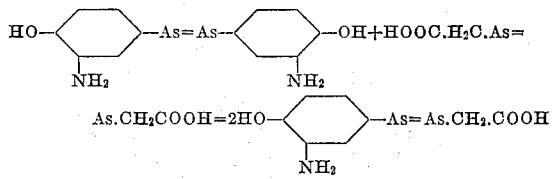

*Example VIII.*—13.5 grams of arseno-acetic acid and 18.3 grams of 3,3′-diamino-4,4′-dihydroxyarsenobenzene are dissolved in 100 cc. of pyridine and the solution heated at 90° C. in a stream of nitrogen for an hour, cooled and poured slowly into 250 cc. of 37% hydrochloric acid. The precipitate is filtered and washed out of contact with the air and dried in an atmosphere of carbon dioxide. The reaction and constitution of the product are thought to be expressed by the equation given in Example VII above.

While I prefer to use hypophosphorous acid as a reducing agent, it must be understood that my invention is not limited in this respect since I may use other suitable reducing agents capable of bringing about the same reaction.

I claim:

1. An arseno-compound in which at least one aliphatic radical substituted with a salt forming group is bonded to an arsenic atom connected to another arsenic atom.

2. An arseno-compound of the constitution $R_1As=AsR_2$, $R_1$ being an aliphatic radical substituted with a salt forming group and $R_2$ being a substituted aromatic radical.

3. A compound containing a plurality of arsenic atoms joined together, an aliphatic group substituted with a salt forming group attached to one arsenic atom and an organic group attached to a different arsenic atom.

4. A compound containing a plurality of arsenic atoms joined together, an aliphatic group substituted with a salt forming group attached to one arsenic atom and an aromatic group attached to a different arsenic atom.

5. A compound having the formula

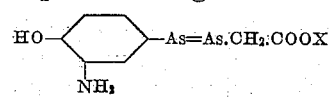

in which X is a substituted atom or radical.

6. A compound containing at least three arsenic atoms bonded together, an aliphatic group substituted with a salt forming group attached to one arsenic atom and an organic group attached to a different arsenic atom.

7. The method of forming arseno-compounds containing a plurality of arsenic atoms bonded together which comprises reducing an aliphatic arsonic acid substituted with a salt forming group in the presence of an arsenious compound.

8. The method of producing an arseno-compound which comprises subjecting in an acid medium an aliphatic arseno-compound substituted with a salt forming group and a substituted aromatic arsono-compound together to a reducing action.

9. The method of producing an arseno-compound containing a plurality of arsenic atoms bonded together, one of which is bonded to an aryl residue and another of which is bonded to an alkyl residue, which comprises reacting upon an aliphatic arseno-compound substituted with a salt forming group with a substituted aromatic arseno-compound in an alkaline medium.

10. The method of forming arseno-compounds containing a plurality of arsenic atoms bonded together which comprises subjecting an aliphatic arsono-compound substituted with a salt forming group to the action of hypophosphorous acid in an acid medium in the cold.

11. The method of forming arseno-compounds containing a plurality of arsenic atoms bonded together which comprises subjecting an aliphatic arsono-compound substituted with a salt forming group and a substituted aromatic arsono-compound to the action of hypophosphorous acid in an acid medium in the cold.

CHARLES S. PALMER.